United States Patent [19]
Gebregiorgis et al.

[11] Patent Number: 6,114,040
[45] Date of Patent: Sep. 5, 2000

[54] CATHODIC ELECTRODEPOSITED COATINGS HAVING HIGH LUBRICITY

[75] Inventors: Taddesse Gebregiorgis, Sterling Heights, Mich.; Kathleen S. Shields, Landenberg, Pa.; John Joseph Vincent, Sterling Heights, Mich.

[73] Assignee: E. I. du Pont de Nemours and Company, Wilmington, Del.

[21] Appl. No.: 09/149,676

[22] Filed: Sep. 9, 1998

[51] Int. Cl.⁷ .................................................. B32B 15/08
[52] U.S. Cl. ........................... 428/416; 204/502; 523/406
[58] Field of Search ........................... 523/406; 428/416; 204/499, 501, 502, 504, 507

[56] References Cited

U.S. PATENT DOCUMENTS

| | | | |
|---|---|---|---|
| 3,922,253 | 11/1975 | Jerabek et al. | 260/77 |
| 4,087,394 | 5/1978 | Concannon | 260/29.6 |
| 4,137,140 | 1/1979 | Belanger | 204/181 |
| 4,335,030 | 6/1982 | Concannon | 523/408 |
| 4,393,119 | 7/1983 | Concannon | 428/413 |
| 4,419,467 | 12/1983 | Wismer et al. | 523/414 |
| 4,468,307 | 8/1984 | Wismer et al. | 204/181 |
| 4,728,398 | 3/1988 | Paulet et al. | 204/16 |
| 5,356,960 | 10/1994 | Chung et al. | 523/404 |
| 5,468,461 | 11/1995 | Hosoda et al. | 523/435 |

OTHER PUBLICATIONS

John J. Vincent, The NACE Annual Conference and Corrosion Show, *Corrosion 91*, Cincinnati Convention Center, Cincinnati, Ohio, Mar. 11–15, 1991.

*Primary Examiner*—Robert Dawson
*Assistant Examiner*—D. Aylward

[57] ABSTRACT

Self-lubricating is provided for cathodic electrodeposited coatings by including in the coating bath fine particles of polytetrafluoroethylene that have been milled with a cationic polyepoxide resin.

14 Claims, No Drawings

CATHODIC ELECTRODEPOSITED COATINGS HAVING HIGH LUBRICITY

FIELD OF THE INVENTION

The present invention relates to aqueous dispersions containing cationic resins and highly fluorinated resins, and to the use of these dispersions in cathodic electrodeposition processes to produce coatings exhibiting improved lubricity.

BACKGROUND OF THE INVENTION

Electrodeposition technology is well known in the art for applying coatings, such as paint, to electrically conductive substrates.

Cathodic electrodeposition, wherein a positively charged coating dispersion is deposited on a negatively charged substrate, is generally preferred over anodic electrodeposition because cathodic electrodeposition exhibits better throw power in coating complex shapes. "Throw power" is the ability of an electrodeposition bath to deposit a uniform coating and cover recessed areas, such as inner surfaces of automobile door and hood panels, where conventional spray coating techniques cannot reach. Thus, the metal part coated by a cathodic electrodeposition (i.e., electrocoating) process generally exhibits improved corrosion resistance compared to similar parts coated by an anodic electrodeposition process. An excellent description of the cathodic electrodeposition process is provided by John Vincent in Paper 418, Automotive Cathodic Electrodeposition, *Corrosion* 91, available from the National Association of Corrosion Engineers (NACE).

A typical cathodic electrodeposition coating bath contains an epoxy-amine adduct or resin and a blocked polyisocyanate cross-linking agent. This mixture is partially neutralized with an organic acid and emulsified in water to form a resin feed package. A blend of pigments, selected to provide desired appearance, color, and other properties, is dispersed in a grinding medium as a pigment feed package. The two packages are continuously fed to the continuous electrodeposition bath to replenish the bath solids (non-volatiles) as metal parts are coated. Representative coating baths and cathodic electrodeposition processes are disclosed in U.S. Pat. No. 5,356,960 to Chung and Gam; U.S. Pat. No. 3,922,253 to Jarabek et al.; U.S. Pat. No. 4,419,467 and U.S. Pat. No. 4,468,307 to Cuismer et al; and U.S. Pat. No. 4,137,140 to Belanger.

Electrocoated metals may be used in applications where they are exposed to friction with other metal parts, such as seat tracks in vehicles, or to friction with materials such as engineering plastics (e.g., plastic bushings in vehicle window tracks). The cured electrodeposited coating is not self lubricating, and thus typically is lubricated with a surface coating of dry lubricant or grease for such applications where friction is encountered.

Dry fluorinated resin lubricants such as poly (tetrafluoroethylene), lubricate well under light loads, but typically do not perform well under heavy loads. Moreover, such lubricants require separate application and are easily removed in use. Greases also readily transfer to adjacent surfaces (e.g., carpet or glass), or by accidental contact with the skin or clothes of those using the electrocoated metal parts. Greases also may require periodic reapplication, and may degrade properties of engineering plastics, such as those commonly used in plastic bearings. Thus, there is an ongoing need to improve the self-lubrication properties of cathodic electrodeposition coatings.

Highly fluorinated polymers, such as poly (tetrafluoroethylene), are well known in the art as having self-lubricating (i.e., "slippery") surfaces. It has been proposed to add such fluorinated polymers to various compositions to improve lubricity (i.e., self-lubrication) to the composition. For example, Hosoda et al., disclose a primer composition containing an epoxy resin, an aromatic polyamine, a polyisocyanate and a lubricant, which may be a fluorinated resin, to improve press formability, in a solvent such as cyclohexanone (U.S. Pat. No. 5,468,461).

Fluorinated resins have not heretofore been incorporated in cathodic electrodeposition coating baths since such resins are nonionic, and thus will not migrate to the cathode during the electrocoating process.

SUMMARY OF THE INVENTION

It now has been found surfaces of metals coated by the cathodic electrodeposition process having improved lubricity (i.e., self-lubrication, or lowered coefficient of friction) are obtained by including, in the coating bath, highly fluorinated polymer particles that have been milled with the polyepoxide resin employed in the coating bath, or a similar resin, then forming an aqueous dispersion of the milled particles. In a preferred embodiment, the milled fluorinated polymer is combined with the pigment dispersion package, then added to the coating bath.

Accordingly, the present invention provides, in an aqueous cathodic electrocoating bath containing a cationic polyepoxide resin having amine endcaps, a cross-linking agent, and dispersed pigment particles, the improvement wherein lubricity of the resulting cured electrocoated composition is increased by including in said bath dispersed particles of a highly fluorinated nonionic resin having (i) an average particle size in the range of 0.01 to 10 μm and an average molecular weight in the range of 2,000 to 1,000,000 and (ii) a cationic polyepoxide resin coating having amine endcaps; said highly fluorinated resin particles comprising 10% to 35% by weight of nonvolatile components contained in said bath.

In another embodiment, the invention provides metal parts bearing a cured cathodic polyepoxide electrocoating wherein the coating contains uniformly dispersed particles of a highly fluorinated resin in at least a portion of said coating, the resin particles having an average size in the range of 0.1 to 10 μm and comprising 10% to 35%, by weight, of said coating.

DETAILED DESCRIPTION OF THE INVENTION

The present invention provides an electrodeposited coating of high lubricity on metal surfaces and a process for making such coatings. More specifically, the present invention provides aqueous cathodic electrodepositable coating baths containing cationic resins (polymers) and highly fluorinated resins for the production of coatings exhibiting excellent lubricity, unimpaired corrosion and wear resistance, and good adhesion performance. In the practice of the invention, highly fluorinated resin particles, such as poly(tetrafluoroethylene) (PTFE), conveniently are introduced into the cathodic electrocoat bath in a composite aqueous pigment dispersion.

Cationic Resins

The cationic resin is a polyepoxide resin with amine endcaps that create the positive, or cationic, charge. These resins typically are made from polyepoxides that have been chain extended then reacted with an amine to introduce the endcap. The cationic resin typically has a molecular weight in the range of 2,000 to 25,000.

A cross-linking agent, typically an alcohol blocked isocyanate, is blended with the cationic resin. The resulting mixture then is neutralized with an organic acid to form an aqueous dispersion, referred to as "the principal emulsion."

Principal emulsions are well known in the art. Cormax® Plus (a three-component epoxy-urethane comprising a resin feed, and a pigment paste) is available from E. I. Du Pont de Nemours and Company of Wilmington, Del.

Fluorinated Resins

The fluorinated resin lubricants selected in practicing the invention are finely divided dispersible powders. Dispersible poly(tetrafluoroethylene) powders having high surface area (small particle size) and relatively low molecular weight are preferred. The average particle size range should be in the range of 0.01 μm to 10 μm, and preferably from about 0.5 μm to about 2 μm. A wide range of molecular weight can be used, preferably about 2,000 to about 1,000,000, and most preferably from about 25,000 to about 50,000. Small particle sizes and lower molecular weights provide better adherence to the substrate and allow lower baking temperatures. Additionally, small fluorinated resin particle sizes facilitate the dispersion of the resin with the pigment.

KRYTOX® GT [a poly(tetrafluoroethylene)] dispersible powder with average particle size less than 0.2 μm molecular weight about 40,000 available from E. I. du Pont de Nemours and Company, Wilmington, Del. is a preferred resin. Other fluorinated resin lubricants that may be selected include ZONYL® MP 1600, and its aqueous dispersion ZONYL® TE3667N [poly(tetrafluoroethylene) having a molecular weight about 100,000], KRYTOX® 1000 [a poly (tetrafluoroethylene) dispersion in 1,1,-dichloro-1-fluoroethane], and irradiated micropowders such as DU PONT MP 1100 poly(tetrafluoroethylene), all available from E. I. du Pont de Nemours and Company, Wilmington, Del.). Others include HOSTAFLON TF-9202 (a fluorinated resin dispersion having MW greater than 100,000, available from Hoechst, Somerset N.J.); TL-102 (a fluorinated resin dispersion of MW greater than 100,000, available from ICI Americas, Wilmington Del.); and L-203 (a fluorinated resin dispersion available from Ausimont, New York, N.Y.).

Pigment Dispersion

The fluorinated resin conveniently is introduced to the coating bath as a component of the pigment dispersion package. In this embodiment, the fluorinated resin powder is dispersed with the selected pigment powder(s) in a cationic resin that is the same as, or compatible with, the cationic resin employed in the coating bath. The fluorinated resin may be added as a powder, or as an aqueous dispersion, as the components are agitated to disperse the fluorinated resin powder in the cationic resin.

Viscosity of the dispersion is important for the subsequent milling step. Brookfield viscosity typically is used to monitor the viscosity, in accordance with ASTM D-2196. While the desired viscosity will vary with the selected components, viscosity generally will be in the range of 8000 cP to 1500 cP (0.8 Pa.s to 1.5 Pa.s) to achieve a fine grind during milling. Viscosity typically increases during grinding, and is readily adjusted by modifying the amount of water (typically deionized water) present.

The dispersion then is milled (typically using an Eiger mill, Dynomill, and/or sand grinder) to achieve very small particle size distribution. Milling is continued until a "Hegman reading" of seven or greater is obtained, which is a conventional measurement of the coarsest particles present in the dispersion. Other means may be employed to assure that the particles have been ground sufficiently to minimize the presence of large particles that would adversely affect the electrocoating process.

Predispersion of the fluorinated resin in this manner provides a cationic charge for the fluorinated resin particles, by coating or wetting the particles with the cationic resin. Moreover, predispersion in this manner minimizes incompatibilities between the fluorinated resin and other components that were observed when directly adding the fluorinated resin particles to the coating bath.

Coating Bath

The pigment dispersion containing the dispersed fluorinated resin then is added to the cationic resin principal emulsion, with agitation, to form the cationic electrocoating bath. Components such as wetting agents, surfactants, defoamers, and plasticizers may be included in the bath for conventional purposes.

The amount of fluorinated resin present in the coating bath conveniently is expressed in terms of weight percent of the fluorinated resin, based on total weight of the nonvolatile components, including pigment. In practice, coating baths containing 10% to 35% fluorinated resin have been found to reduce the coefficient of friction of resulting coatings, thereby providing lubricity. The proportion of fluorinated resin in the dried coating will be approximately the same as that contained in the bath.

The electrocoating bath is ultrafiltered, the solids adjusted to the desired level, typically about 20%, with deionized water and placed in an insulated tank containing the anode. The metal part to be coated is the cathode. The metal part, under a negative voltage potential, is passed through the tank containing the electrodeposition bath. The thickness of the deposited coating is a function of the bath characteristics, the electrical operating characteristics, the immersion time, and the like. The resulting coated metal part is removed from the bath after a set period of time and is rinsed with deionized water. The coating is cured, typically in an oven, at sufficient temperature to produce a cross-linked finish on the metal part.

Typical electrodepositing conditions utilize a potential of 200 to 270 volts and an immersion time sufficient to obtain a cured coating of 0.5 to 1.5 mils (13 to 38 μm), preferably 0.8 to 1.2 mils (20 to 30 μm). The metal part then is rinsed and baked at a metal temperature of 300° F. to 360° F. (149° C. to 182° C.) for a time sufficient to cure the coating, typically about 10 minutes at metal temperature. The preceding application details exemplify, and do not limit the invention; many variations will be apparent to those skilled in the art.

Stability of the electrocoat bath is equivalent to that of the electrocoat bath without the highly fluorinated resin. The resin does not alter the critical electrocoat bath properties, such as pH, conductivity, coating voltage, rupture voltage, and throw power. The "coating voltage" is the direct current voltage which will deposit the required film thickness at the specified bath temperature and coating time. The "rupture voltage" is the direct current voltage at which hydrogen gas and heat evolution, accompanied by electrical discharges between the bath and metal substrate, will cause defects such as heavy film areas, blisters, and/or craters to appear. Such defects can adversely affect appearance, corrosion resistance, and lubricity. "Throw power" is defined above.

Cured films containing the highly fluorinated resin exhibit corrosion performance comparable to that provided by the cured films without the resin. The films have excellent lubricity, eliminating the need for added lubrication. The incorporated fluorinated resin, unlike greases applied to the surface, neither mars materials it comes in contact with, nor degrades the physical properties of engineering plastics that it contacts.

The invention has been described in detail with respect to a preferred embodiment wherein dry fluorinated resin particles are dispersed and milled with a cationic resin as a component of the pigment package. It will be appreciated that the fluorinated resin particles may be milled with a cationic resin in a similar manner without pigment being present, and added to the coating bath as a separate dispersion. Likewise, the fluorinated resin particles may be introduced to the milling step as a dispersion provided that components in the dispersion are compatible with the cationic resin, other components present in the coating bath, and the electrodeposition process.

Examples of aqueous dispersions of fluorinated resins include dispersions of poly(tetrafluoroethylene) prepared in water, or by degradation via high energy radiation (micropowders), and similar compositions prepared by the polymerization of hexafluoropropylene and other fluorinated alkenes and by the copolymerization of mixtures of these fluoroalkene monomers with tetrafluoroethylene. Commercial materials include KRYTOX® LW-1200, an aqueous dispersion of poly(tetrafluoroethylene) with average particle size less than 0.2 µm, MW approximately 40,000, available from E. I. du Pont de Nemours and Company, Wilmington, Del., ZONYL®TE3667N, an aqueous predispersion of ZONYL® MP 1600, available from E. I. du Pont de Nemours and Company, Wilmington, Del.; and HOSTAFLON TF 9201, an aqueous predispersion of HOSTAFLON TF-9202, available from Hoechst, Somerset, N.J.

INDUSTRIAL APPLICABILITY

The invention provides a mixture of a conventional aqueous dispersion of a cathodic coating binder and a dispersible powder of a particulate solid fluorinated resin lubricant. Other optional components, such as pigments in the form of a pigment paste, wetting agents, surfactants, defoamers, and plasticizers are incorporated into the composition. The specific and typical procedure for the bath preparation is detailed in Comparative Example A, steps A through G. Recommended operating bath ranges are:

| | |
|---|---|
| pH | 5.5–6.5 |
| Non-volatiles | 15.0–25% by weight |
| Conductivity | 1,300–2,700 µS |
| Pigment level | 10–25% of nonvolatiles |
| Acid, milli-equivalents | 20–45 mE/g of bath |
| Coating temperature | 80° F.–100° F. (27° C.–38° C.) |
| Agitation | 300–800 rpm for a 1 inch diameter (2.54 cm) agitator in a 1 gal. (3.8 L) container |

Having described the invention, the following examples will illustrate, but not limit, the invention.

EXAMPLES

The property of lubricity is quantified by the measurement of the static and dynamic coefficients of friction, as described in Test Methods, below:

Materials

Test Panels: Phosphated (Parker-Amchem 952) cold rolled steel 4×12 inch (10.2×30.5 cm) panels were used for corrosion and chip resistance testing. These panels are available from ACT, Hillsdale Mich.

Steel Coupons: Panels coated were standard carbon steel test coupons such as Q-35 and S-35 panels available from Q-Panel Company, West Lake, Ohio.

Test Methods
Test Method 1: Cured Film Thickness

Coating thicknesses were measured from micrographs at 400×magnification of cross sections of the coatings. Maximum and minimum thickness measurements were made both before and after Taber abrasion wear testing.

Test Method 2: Corrosion Testing

Parts and test panels were tested according to General Motors Engineering Standard GM 9540P, available from GM Engineering Standards, GM Technical Center, Warren Mich.

Test Method 3: Pencil Hardness, Paint Adhesion, and Chip Resistance

Pencil Hardness was measured according to FLTM# BI 151-01, Paint Adhesion was measured according to FLTM# BI 106-01, and Chip Resistance was measured according to FLTM# BI157-05, all available from Ford Motor Company, Engineering Materials and Standards, Dearborn, Mich.

Test Method 4: Determination of the Dynamic Coefficient of Friction

The Dynamic Coefficient of Friction Test Method uses an Altek Model 9505A Lubricity Tester, following the procedure in the manual for the tester. A stainless steel weight is used. Altek is located in Torrington, Conn.

Test Method 5: Static Determination of the Coefficient of Friction (DELRIN sled)

The Static Coefficient of Friction Test Method is a modified ASTM D4518A (ASTM D4518-91) Method A: Inclined Plane Test. The coating application method used the cathodic electrocoating technology described in this patent. The test sled was also modified and utilized a 169.2 g DELRIN sled of dimensions 3⅛×3⅞0 inches (7.94×9.84 cm). DELRIN is an acetal resin available from E. I. du Pont de Nemours, Wilmington Del.

Test Method 6: Wear Resistance

Wear resistance was measured by coating standard Taber Abraser panels and testing on the Taber Abraser using a CS17 wheel (rubber with abrasive grains) and 500 gram weights. Testing was conducted for 1200 cycles or wear-through whichever came first.

Test Method 7: Pigment Dispersion Viscosity

Viscosity of the pigment dispersion prior to grinding is measured in accordance with ASTM Method D-2196.

EXAMPLES

Comparative Example A
A. Preparation of Chain Extended Polyepoxide Resinous Binder The following ingredients were charged under a nitrogen blanket into a suitable reaction vessel:

1478 g EPON 828 (epoxy resin of the diglycidyl ether of bisphenol A having an epoxy equivalent weight of 188, available from Shell Chemical Company, Houston Tex.;

427 g bisphenol A (4,4'-isopropylidenediphenol, available from Shell Chemical Company, Houston Tex.;

533 g ethoxylated bisphenol A having a hydroxy equivalent weight of 247 (SYNFAC 8009, available from Milliken Chemicals, Inman S.C.); and 121 g xylene.

The resulting reaction mixture was heated under a nitrogen blanket to 146° C. At 146° C., 5.1 gms dimethylbenzylamine (catalyst) were added and the mixture was allowed to exotherm to 158° C. and held at 158° C. until an epoxy equivalent weight (determined by the American Society for Testing Materials test ASTM-1652) of 1050 was obtained. The reaction mixture was cooled to 98° C. and 168 g diketimine (reaction product of diethylenetriamine and methylisobutylketone having a nonvolatile content of 72.27%) and 143 g methyl ethanolamine were added. The resulting mixture was allowed to exotherm to 120° C. and held at 120° C. for 1 hour. The reaction mixture was cooled below 115° C. and then 727 g methylisobutylketone were added. The resulting resin solution had a nonvolatile content of 75%.

B. Preparation of Crosslinking Resin Solution

An alcohol-blocked polyisocyanate crosslinking resin solution was prepared under a nitrogen blanket by charging:

400.27 g Isonate 2181 (methylene diphenyl diisocyanate, available from Dow Chemical Company, Midland Mich.); 94.41 g methylisobutylketone; and 0.086 g of dibutyltin dilaurate into a suitable reaction vessel and heated to 37° C.

259.73 gms of glycol ether-alcohol blend (methanol, ethanol, and diethylene glycol monobutyl ether in 1:1:1.32 equivalent ratio) was slowly charged into a soluble reaction vessel while maintaining the reaction mixture below 93° C., which temperature was held for an additional hour until essentially all of the isocyanate was reacted as indicated by an infrared scan of the reaction mixture. 2.30 g of butanol and 123.3 g of methylisobutylketone were added. The resulting resin solution had a nonvolatile content of 75%.

C. Preparation of Quaternizing Agent

The quaternizing agent was prepared under a nitrogen blanket by adding 87 g dimethylethanolamine to 320 g ethylhexanol half-capped toluene diisocyanate (available from PPG Industries, Pittsburgh Pa.) in the reaction vessel at room temperature. An exothermic reaction occurred and the reaction mixture was stirred for one hour at 80° C. 118 g aqueous lactic acid solution (75% nonvolatile content) was then added followed by the addition of 39 g 2-butoxyethanol. The reaction mixture was held for about one hour at 65° C. with constant stirring to form the quaternizing agent.

D. Preparation of Pigment Grinding Vehicle

The pigment grinding vehicle was prepared by charging 710 g EPON 829 (diglycidyl ether of bisphenol A having an epoxide equivalent weight of 193–203, and 290 g bisphenol A into a suitable vessel under a nitrogen blanket and heated to 150° C. to 160° C. to initiate an exothermic reaction. The exothermic reaction was allowed to reach 180° C. to 200° C., cooled to 180° C. and held at 180° C. for until the epoxy molecular weight (determined by the American Society for Testing Materials test ASTM-1652) reached 800. The reaction mixture was then cooled to 120° C. and 496 g 2-ethylhexanol half-capped toluene diisocyanate was added. The temperature of the reaction mixture was held at 110° C. to 120° C. for one hour, followed by the addition of 1095 g 2-butoxyethanol, the reaction mixture was then cooled to 85° C. to 90° C. and then 71 g deionized water were added followed by the addition of 496 g quaternizing agent (prepared above). The temperature of the reaction mixture was held at 85° C. to 90° C. until an acid value of about 1 was obtained.

E. Preparation of Emulsion

The emulsion composition is shown in Table 1. The chain extended polyepoxide resinous binder, crosslinking resin solution, surfactant, and lactic acid were thoroughly mixed. Then the deionized water was then added with agitation. The emulsion nonvolatile content was adjusted to 36% with the necessary amount of deionized water. The emulsion was kept agitated until the methylisobutylketone had evaporated, preferably while heated at about 75° C. and under a reduced pressure of 3 psia (21 kPa).

TABLE 1

Emulsion Composition

| Ingredient | g |
|---|---|
| Chain extended polyepoxide resinous binder (prepared above) | 1,255.31 |
| Crosslinking resin solution (prepared above) | 805.85 |
| Surfactant* | 13.62 |
| Lactic acid | 27.24 |
| Deionized water | 1,897.98 |
| Total | 4,000.00 |

*Surfactant is a preformulated mixture of 120 g coconut fatty alkyl hydroxyimidazoline, 120 g SURFYNOL 104 (acetylene alcohol, 120 g 2-butoxy ethanol, 221 g deionized water, and 19 g lactic acid from Air Products and Chemicals Inc., Allentown Pennsylvania).

F. Preparation of Pigment Paste

The pigment paste was prepared with the ingredients shown in Table 2 for the Comparative Example A. The ingredients were mixed until a homogeneous mixture was formed in a suitable mixing container. They were then dispersed by charging the mixture into a sand mill and grinding until a Hegman reading of seven or greater was obtained.

Tin compounds are commonly used as film curing agents and may be dispersed with pigments in the pigment paste. Dibutyl tin oxide is the catalyst of choice and may be ground separately and added as in Example Paste 3. Dibutyl tin compounds require careful handling. Dispersion with the pigment may be more convenient when working with standard batches of emulsion (see Section E, Preparation of Emulsion). Separate grinding may be more convenient when smaller batches are prepared, e.g., when testing different levels of PTFE. The choice is based on safety and convenience.

TABLE 2

Pigment Paste Compositions

| Ingredient (g) | Comparative Example Pastes | | Example Pastes | | |
|---|---|---|---|---|---|
| | A | B | 1 | 2 | 3 |
| Pigment grinding vehicle (prepared above) | 635 | 776 | 776 | 862 | 873 |
| Deionized water | 1691 | 1433 | 1455 | 1638 | 1861 |
| Aluminum silicate | 468 | 1061 | — | — | — |
| Poly(tetrafluoroethylene) | — | — | 1061 | 1500 | — |
| Lead silicate pigment | — | 180 | 180 | — | — |
| Carbon black pigment | 83 | 135 | 135 | — | — |
| Dibutyltin oxide | — | — | — | — | 1266 |
| Zinc hydroxy phosphite | 41 | — | — | — | — |
| Barium sulfate | 647 | — | — | — | — |
| Example Paste #3 | 435 | 415 | 393 | — | — |
| Total | 4000 | 4000 | 4000 | 4000 | 4000 |
| % poly(tetrafluoroethylene on nonvolatile) | 0 | 0 | 53.1 | 75.0 | 0 |
| % poly(tetrafluoroethylene on pigment | 0 | 0 | 70.7 | 100.0 | 0 |
| Nonvolatile % | 45.0 | 50.25 | 50.0 | 50.0 | 44.3 |

Pigment pastes are often reduced with deionized water to facilitate grinding. This procedure reduces the non-volatile level (see above) but not the content of the vehicle and pigment pastes.

G. Preparation of Electrocoating Bath

The cationic electrodeposition baths were prepared by mixing the ingredients shown in Table 3 and each bath was ultrafiltered.

Galvanized window track assemblies were electrocoated with Bath 1 at 250–270 volts to obtain 0.9–1.0 mils (22.86–25.4 μm), baked at a metal temperature of 182° C. for 10 minutes, and evaluated.

Additionally, zinc phosphate treated steel test metal panels were similarly electrocoated, baked at the same metal temperature, and tested according to Test Methods 2 through 6. The results are shown in Table 4.

TABLE 3

Electrocoating Bath Composition

| Ingredients (Quantities in Grams) | Comparative Baths | | | Example Baths | | | |
|---|---|---|---|---|---|---|---|
| | A | B | C | 1 | 2 | 3 | 4 |
| Emulsion 35.5% nonvolatile (prepared above) | 1748 | 1652 | 1292 | 1339 | 1309 | 1646 | 1681 |
| Deionized water | 1764 | 1921 | 2025 | 1751 | 1878 | 1830 | 1749 |

TABLE 3-continued

Electrocoating Bath Composition

| Ingredients | Comparative Baths | | | Example Baths | | | |
|---|---|---|---|---|---|---|---|
| Quantities in Grams) | A | B | C | 1 | 2 | 3 | 4 |
| Pigment Paste (prepared above) | | | | | | | |
| Comparative Paste A (45% nonvolatile) | 488 | — | — | — | — | — | — |
| Comparative Paste B (50% nonvolatile) | — | 427 | 683 | — | 193 | 110 | — |
| Paste 1 (40% nonvolatile) | — | — | — | 910 | — | — | — |
| Paste 2 (38% nonvolatile) | — | — | — | — | 543 | 331 | 530 |
| Paste 3 (42% nonvolatile) | — | — | — | — | 77 | 83 | 40 |
| Totals | 4000 | 4000 | 4000 | 4000 | 4000 | 4000 | 4000 |

Example 1

The chain extended polyepoxide resinous binder, crosslinking resin solution, quaternizing solution, pigment grinding vehicle, and emulsion were prepared according to Steps A through E of Comparative Example A. The pigment paste was prepared with the ingredients shown in Table 2 for Example 1. The ingredients were mixed until a homogeneous mixture was formed in a suitable mixing container. They were then dispersed by charging the mixture into a sand mill and grinding until a Hegman reading of seven or greater was obtained. The electrocoating bath was prepared with the amended pigment paste containing the fluoropolymer resin. The bath was ultrafiltered and used to electrocoat window track assemblies as in Comparative Example A. The assemblies were dried, baked at a metal temperature of 300° F. to 360° F. (149° C. to 182° C.), and tested as for Comparative Example A. The results are shown in Table 4.

TABLE 4

Test Data for Comparative Examples A–C and Examples 1–4.

| | Comparative Example | | | Example | | | |
|---|---|---|---|---|---|---|---|
| | A | B | C | 1 | 2 | 3 | 4 |
| Composition Information: | | | | | | | |
| % pigment | 20 | 20 | 32 | 32.5 | 31.3 | 20 | 20 |
| % PTFE (on pigment) | 0 | 0 | 0 | 70.85 | 61.86 | 58.8 | 92.5 |
| % PTFE (on total nonvolatiles) | 0 | 0 | 0 | 23.0 | 19.3 | 11.8 | 18.5 |
| Performance Data: | | | | | | | |
| Static Coefficient of Friction (DELRIN sled, Test Method 5) Modified ASTM D4518A | — | 0.15 | 0.15 | — | 0.12 | 0.14 | 0.12 |
| Dynamic Coefficient of Friction (Stainless steel weight, Test Method 4) Altek 9505A | 0.11 | 0.08 | 0.08 | 0.055 | 0.06 | 0.065 | 0.05 |
| Taber Abraser (Test Method 6) | | | | | | | |
| Cycles* | 1200+ | 1200+ | 900 | 600 | 1200+ | 1200+ | 1200+ |
| Weight loss (mg) | 15 | 14 | 39 | 29 | 30 | 15 | 14 |
| Cross Hatch Adhesion (Test Method 3) % paint loss | 0 | — | — | 0 | — | — | — |
| Chip Resistance (Test Method 3) | pass | — | — | pass | — | — | — |
| Accelerated Corrosion (GM 954OP, mm, Test Method 2) | 4.15 | — | — | 2.82 | — | — | — |
| Fischer Hardness (Average of 2, Test Method 3) | — | 223 | — | — | — | 184 | 170 |
| Thickness from 400× Micrograph (mils [μm]) | | | | | | | |
| Unabraded coating (min.) | — | 0.98 [25] | 0.59 [15] | — | 0.79 [20] | 1.13 [29] | 1.08 [27] |
| Unabraded coating (max.) | — | 1.13 [29] | 0.98 [25] | — | 1.13 [29] | 1.18 [30] | 1.08 [27] |
| Abraded coating (min.) | — | 0.74 [10] | 0.54 [14] | — | 0.49 [12] | 1.13 [29] | 0.94 [24] |
| Abraded coating (max.) | — | 0.84 [21] | 0.59 [15] | — | 0.54 [14] | 0.54 [14] | 0.98 [25] |

***"1200+" indicates the test was completed at 1200 cycles prior to any failure.

The results in Table 4 show superior lubricity for Examples containing the fluorinated resin in the electrocoating bath of this invention compared with the Comparative Examples of the prior art.

The results in Table 4 show unimpaired corrosion resistance, abrasion resistance, and coating adhesion, and comparable hardness, for Examples containing the fluorinated resin in the electrocoating bath of this invention compared with the Comparative Examples of the prior art.

What is claimed is:

1. In an aqueous cathodic electrocoating bath containing a cationic polyepoxide resin having amine endcaps, a crosslinking agent, and dispersed pigment particles, the improvement wherein lubricity of the resulting cured electrocoated composition is increased by including in said bath dispersed particles of a highly fluorinated nonionic resin that have an average particle size in the range of 0.01 μm to 10 μm and an average molecular weight in the range of 2,000 to 1,000,000 and are coated with a cationic polyepoxide resin having amine endcaps.

2. The bath of claim 1 wherein said highly fluorinated nonionic resin particles are composed of polytetrafluoroethylene.

3. The bath of claim 1 or 2 wherein said highly fluorinated nonionic resin particles have an average particle size in the range of 0.5 $\mu$m to 2.0 $\mu$m.

4. The bath of claim 2 wherein said resin particles have an average molecular weight in the range of 25,000 to 50,000.

5. The bath of claim 1 or 2 wherein said resin particles and pigment particles were milled with said cationic polyepoxide.

6. Metal parts bearing a cured cathodic polyepoxide electrocoating wherein said coating contains dispersed particles of a highly fluorinated resin in at least a portion of said coating, said resin having an average particle size in the range of 0.1 $\mu$m to 10 $\mu$m before curing and comprising 10% to 35% by weight of said coating.

7. The part of claim 6 wherein said highly fluorinated resin particles are composed of polytetrafluoroethylene.

8. The part of claim 7 wherein the average particle size of said dispersed resin particles is in the range of 0.5 $\mu$m to 2.0 $\mu$m before curing.

9. The part of claim 6, 7 or 8 wherein said coating is 13 $\mu$m to 40 $\mu$m in thickness.

10. The bath of claim 3 wherein said resin has an average molecular weight in the range of 25,000 to 50,000.

11. The bath of claim 1, 2, or 4 wherein said fluorinated resin comprising 10% to 35% by weigh of nonvolatile components contained in said bath.

12. The bath of claim 3 wherein said fluorinated resin comprising 10% to 35% by weigh of nonvolatile components contained in said bath.

13. The bath of claim 5 wherein said fluorinated resin comprising 10% to 35% by weigh of nonvolatile components contained in said bath.

14. The metal parts of claim 6 wherein said dispersed particles of said fluorinated resin is coated with a cationic polyepoxide resin coating having amine endcaps.

* * * * *